US012401936B2

(12) United States Patent
Attwood

(10) Patent No.: US 12,401,936 B2
(45) Date of Patent: Aug. 26, 2025

(54) ATTACHMENT BRACKET FOR AN EARSHELL

(71) Applicant: Racal Acoustics Ltd, Harrow (GB)

(72) Inventor: Neil Attwood, Harrow (GB)

(73) Assignee: Racal Acoustics Ltd, Harrow (GB)

( * ) Notice: Subject to any disclaimer, the term of this patent is extended or adjusted under 35 U.S.C. 154(b) by 196 days.

(21) Appl. No.: 18/254,283

(22) PCT Filed: Nov. 24, 2021

(86) PCT No.: PCT/GB2021/053046
§ 371 (c)(1),
(2) Date: May 24, 2023

(87) PCT Pub. No.: WO2022/112757
PCT Pub. Date: Jun. 2, 2022

(65) Prior Publication Data

US 2024/0007781 A1 Jan. 4, 2024

(30) Foreign Application Priority Data

Nov. 26, 2020 (GB) ..................................... 2018630

(51) Int. Cl.
*H04R 1/10* (2006.01)

(52) U.S. Cl.
CPC ......... *H04R 1/1066* (2013.01); *H04R 1/1008* (2013.01); *H04R 1/105* (2013.01); *H04R 2201/107* (2013.01)

(58) Field of Classification Search
CPC .... H04R 1/1066; H04R 1/1008; H04R 1/105; H04R 2201/107
See application file for complete search history.

(56) References Cited

U.S. PATENT DOCUMENTS

| | | | | |
|---|---|---|---|---|
| 5,590,213 A * | 12/1996 | Urella | H04R 5/0335 | 381/385 |
| 5,862,241 A * | 1/1999 | Nelson | H04R 1/1066 | 381/374 |
| 8,166,575 B2 * | 5/2012 | Haselmayer | A42B 3/166 | 2/10 |
| 8,213,667 B2 * | 7/2012 | Nelson | H04R 1/1066 | 381/370 |
| 10,912,344 B2 * | 2/2021 | Bohn | A42B 3/16 | |

(Continued)

FOREIGN PATENT DOCUMENTS

| | | | |
|---|---|---|---|
| DE | 10321449 A1 * | 11/2003 | H04R 1/105 |
| EP | 2081401 A2 | 7/2009 | |

(Continued)

OTHER PUBLICATIONS

Search Report under Section 17 for United Kingdom Patent Application No. GB2018630.0, mailed Mar. 16, 2021, 4 pages.

(Continued)

*Primary Examiner* — Oyesola C Ojo

(74) *Attorney, Agent, or Firm* — Withrow + Terranova, PLLC; Vincent K. Gustafson

(57) ABSTRACT

The present invention relates to a communication headset and more particularly to an attachment bracket for connecting an earshell of a communications headset to other components of that headset where the attachment bracket may connect to the earshell by clipping over the earshell.

20 Claims, 12 Drawing Sheets

(56) References Cited

U.S. PATENT DOCUMENTS

| | | | | |
|---|---|---|---|---|
| 10,959,477 | B2 * | 3/2021 | Nordin | A42B 3/166 |
| 11,246,367 | B2 * | 2/2022 | Rogers | A42B 3/04 |
| 2004/0154082 | A1 * | 8/2004 | Saffran | A61F 11/14 2/423 |
| 2005/0213774 | A1 * | 9/2005 | Kleinschmidt | H04R 1/1066 381/72 |
| 2009/0185706 | A1 * | 7/2009 | Ito | H04R 1/105 381/382 |
| 2011/0119804 | A1 * | 5/2011 | Chiang | A61F 11/06 2/209 |
| 2011/0314594 | A1 * | 12/2011 | Rogers | A42B 3/04 2/421 |
| 2012/0087519 | A1 * | 4/2012 | Emilsson | H04R 5/033 381/151 |
| 2012/0288131 | A1 * | 11/2012 | Vaerum | H04R 1/1066 381/378 |
| 2016/0134962 | A1 * | 5/2016 | Gray | H04R 1/1058 381/371 |
| 2017/0214998 | A1 * | 7/2017 | Hoernschemeyer | H04R 1/1066 |
| 2017/0340046 | A1 * | 11/2017 | Le | A61F 11/06 |
| 2018/0249781 | A1 * | 9/2018 | Zawislak | H04R 5/0335 |
| 2019/0356976 | A1 * | 11/2019 | Mobed | H04R 5/0335 |

FOREIGN PATENT DOCUMENTS

| | | | |
|---|---|---|---|
| WO | 2016002546 | A1 | 1/2016 |
| WO | 2017203353 | A2 | 11/2017 |
| WO | 2018148705 | A1 | 8/2018 |

OTHER PUBLICATIONS

International Search Report (Form PCT/ISA/210) for International Application No. PCT/GB2021053046, mailed Feb. 23, 2022, 4 pages.

Written Opinion (Form PCT/ISA/237) for International Application No. PCT/GB2021053046, mailed Feb. 23, 2022, 8 pages.

* cited by examiner

Figure 4
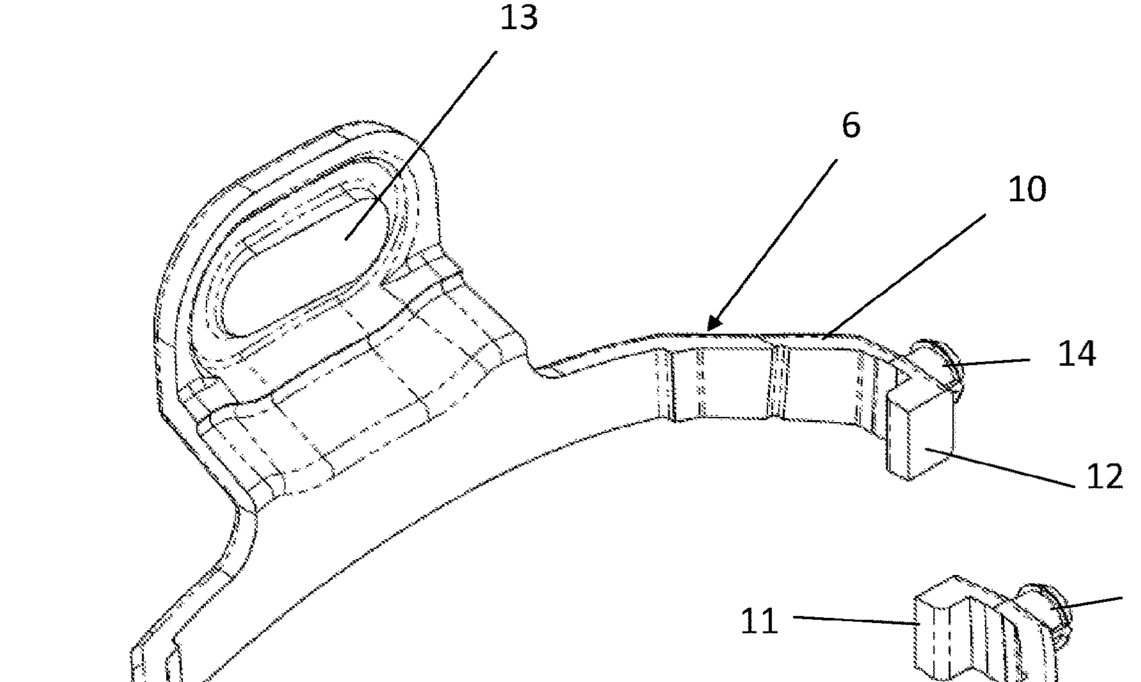
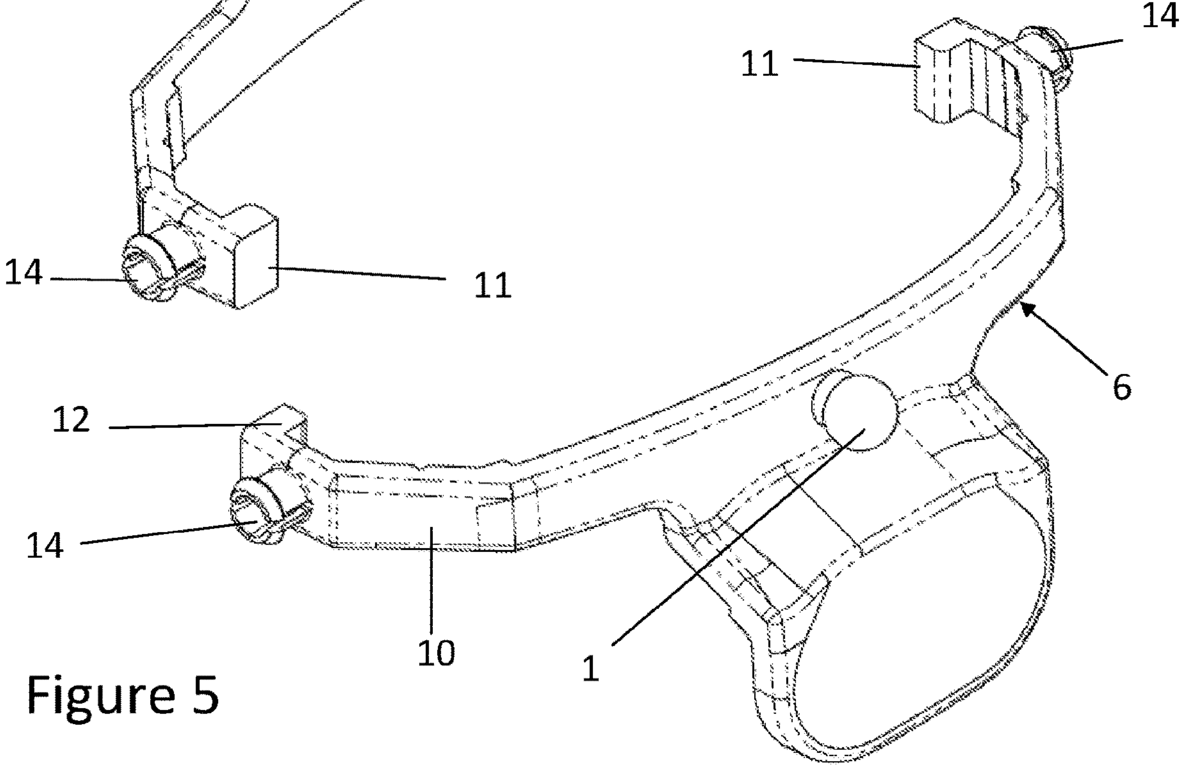
Figure 5

Figure 6
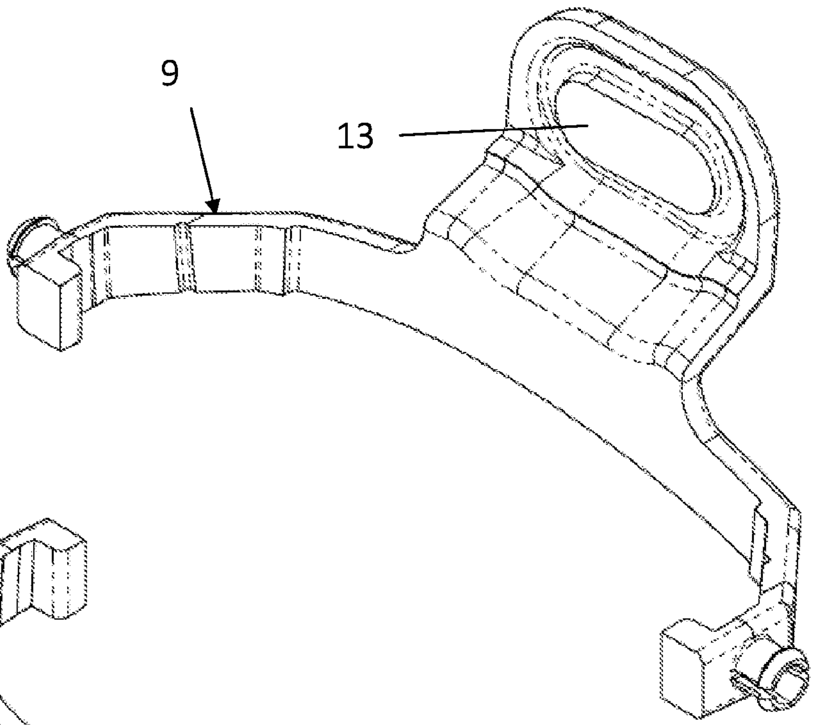
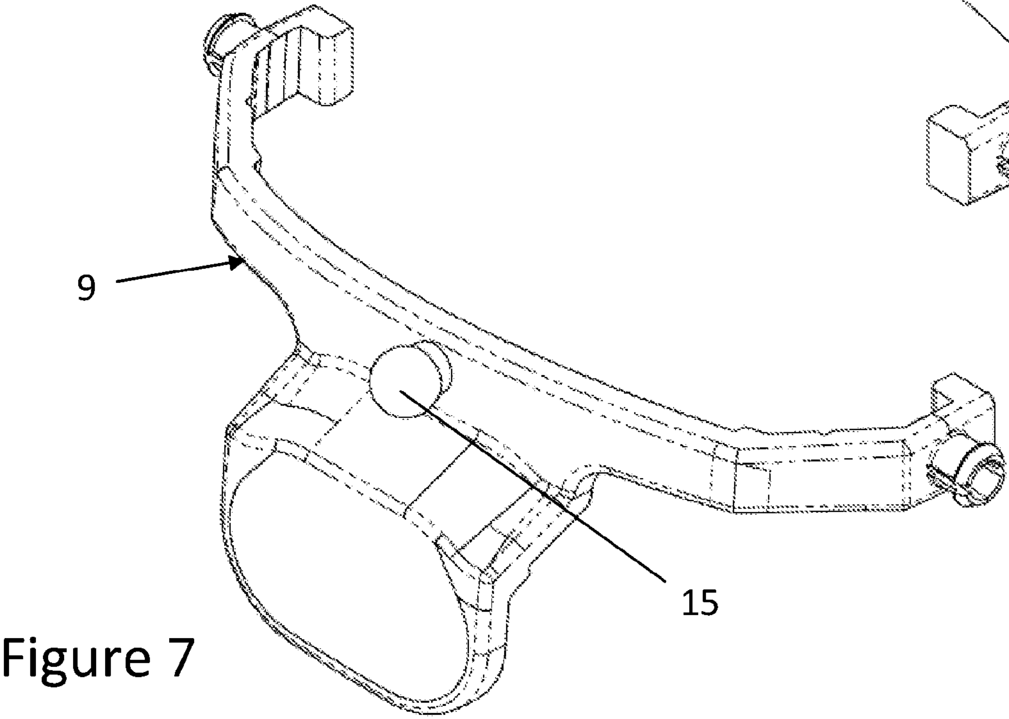
Figure 7

Figure 12
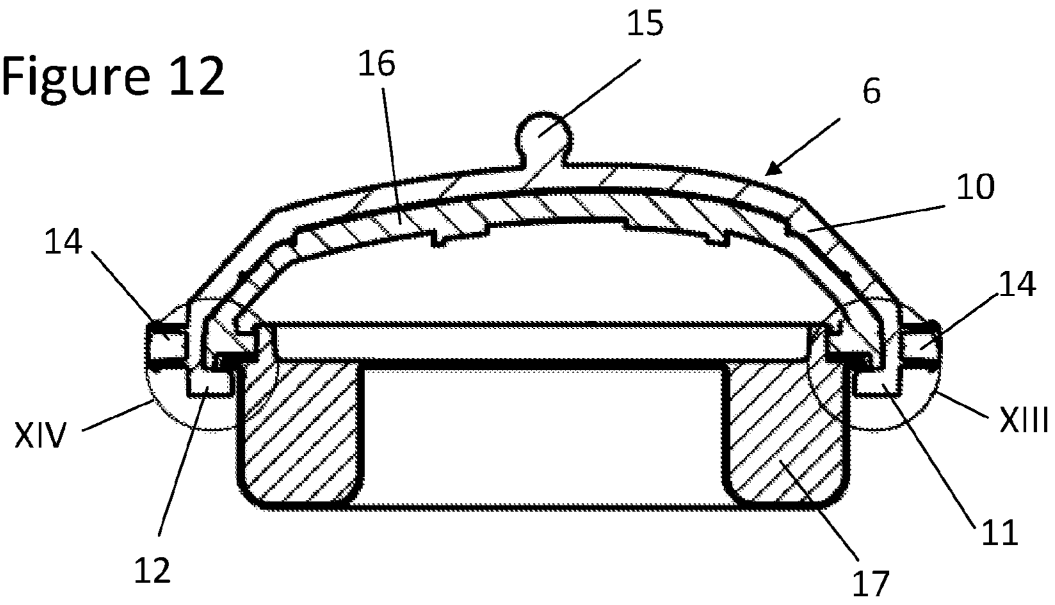
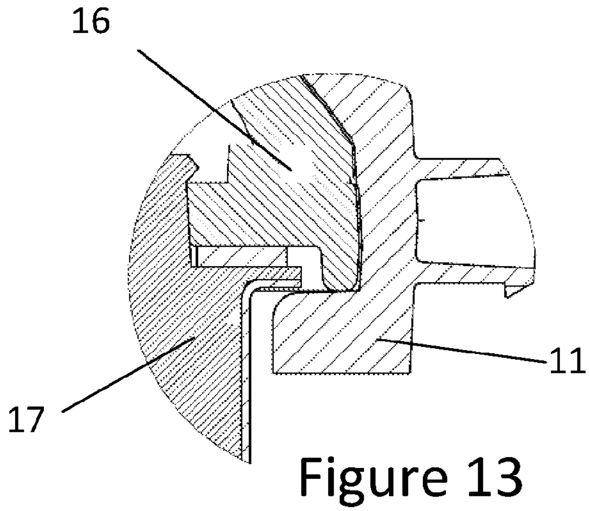
Figure 13
Figure 14
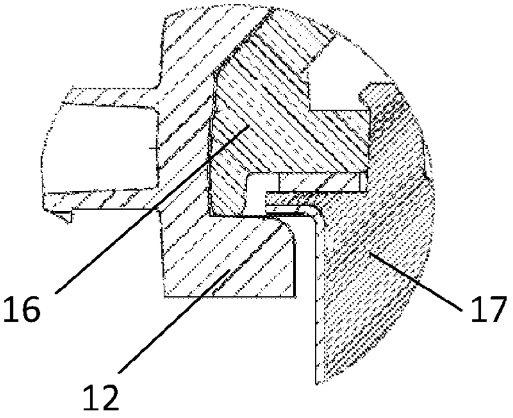

ATTACHMENT BRACKET FOR AN EARSHELL

This application is a 35 U.S.C. § 371 national phase filing of International Application No. PCT/GB2021/053046, filed on Nov. 24, 2021, and claims the benefit of United Kingdom Patent Application No. 2018630.0 filed on Nov. 26, 2020, wherein the entire contents of the foregoing applications are hereby incorporated by reference herein.

The present invention relates to a communication headset and more particularly, to an attachment bracket for connecting an earshell of a communications headset to other components of that headset.

Early forms of communications headsets, which are still relatively popular, typically comprise a headband to go over the head of a user/wearer. These may typically be formed, at least in part, from one or more pieces of wire with a padded covering, or similar, in the region where the headband contacts the head of a wearer. The wires are exposed towards either end, at either side of the head of a wearer, to form a pair of stirrups which each straddle a respective earshell and connect either directly, or indirectly, with either side of the earshell. The stirrups are pivotally connected to the earshell, to permit each earshell to be inclined vertically such that it automatically adopts to the profile of the wearers head. In addition, the top of the headband may be moved either forwards or backwards by the wearer, permitting the typical oval shaped apertures in the ear cushion of each earshell to be aligned, so that they are comfortably positioned over the wearer's ears.

More recently, helmet rail mount systems have been developed, to permit a user to wear a helmet with the earshells mounted to the helmet, without the need for a headband. Here the communications headset comprises a helmet with a rail running around at least one side edge of the helmet, and normally both side edges, with rail mount arms and respective earshells mounted to either side of the helmet, so that in use they cover both the wearers ears, in order to significantly suppress ambient noise. Each rail mount arm is attached at one end to a rail of the helmet, with the other end being attached to the earshell.

The rail mount arm is biased inwards, so as to urge the earshell into contact with the side of a wearer's head, with a single point of connection normally being provided between the rail mount arm and the earshell, which is normally a ball and socket type connection. This permits the earshell to be rotated, so that it may be aligned with the wearers pinna and this also permits the earshell to align itself with the side of the wearers head.

According to a first aspect of the present invention there is provided an attachment bracket suitable for attaching an earshell of a communications headset to one or more of a headband, a rail mount system of a helmet and a neckband, the attachment bracket comprising a main body in the form of a yoke having two end portions and a mid-portion there between, the yoke being shaped to extend around the back of an earshell and to extend at least partway around opposed sides of the earshell, wherein the end portions of the yoke are arranged to clip over a peripheral edge of an earshell.

An attachment bracket, in accordance with the first aspect of the invention, permits a standard earshell to be mounted to a headband, a rail mount system of a helmet or a neckband without the need to have any specific mounting points on the edges of the earshell for mounting to a headband, a rail mount system of a helmet or a neckband in the traditional manner, which mounting points may otherwise make the earshell potentially vulnerable to damage.

The yoke is preferably formed of a resilient material, to permit the yoke to be distorted, to spread the end portions of the yoke to enable the end portions of the yoke to extend over a peripheral edge of an earshell and to subsequently resile, so that the end portions of the yoke engage with the earshell and retain the earshell in the yoke. This enables the attachment bracket, including the yoke, to be relatively inexpensive, avoiding the need to have multiple moving or engaging parts, and preferably the attachment bracket comprises a homogenous single piece of moulded plastic.

Advantageously, the mid portion of the yoke has a first location feature on an inward face arranged to face towards the earshell, the first location feature being arranged to engage with a second location feature formed on the back face of the earshell, to correctly locate the earshell in the yoke. The provision of this further location feature may resist rotation of the earshell relative to the yoke of the attachment bracket, which rotation may otherwise act to dislodge the earshell from the attachment bracket.

The first location feature may be a protrusion with the second location feature being a recess, or vice versa.

The means at each end portion of the yoke, for engaging with the earshell, may be a shaped portion arranged to clip over a front facing edge of the earshell. Such an arrangement enables the earshell to be securely clipped in place in the attachment bracket, the clip acting on a main body of the earshell in order to retain it in place.

The attachment bracket may comprise means at each end portion, for engaging with the stirrups of a headband or of a rail mount system. This may comprise a pin, shaft or ball arranged to engage with a corresponding recess, hole or socket in a respective stirrup, to permit pivotal movement about a first axis of the attachment bracket relative to the stirrup and thus the headband or rail mount system.

The attachment bracket may alternatively, or additionally comprise means located at the mid-portion of the yoke for engaging with the rail mount arm of a helmet rail mount systems or for engaging with an end of the neckband.

The means located at the mid-portion of the yoke, for engaging with a rail mount arm of a helmet rail mount systems, or for engaging with an end of a neckband, preferably permits limited pivotal movement of the attachment bracket relative to either the rail mount arm or the end of a neckband, so that an earshell clipped to the attachment bracket may correctly orientate itself relative to the Pinna and surrounding face of a wearer.

Where the means located at the mid-portion of the yoke is for engaging with an end of a neckband, this may comprise a guide, which guide, when the attachment bracket is attached to an earshell worn by a wearer sitting or standing upright, is substantially horizontal, the guide being arranged to be mounted on the end of a neckband in the form of a resilient rod, with the guide being arranged to permit the earshell to slide backward and forwards on the rod of the neckband and to also pivot on the rod. This arrangement permits an earshell clipped to the attachment bracket to both move backwards and forwards on the neckband and to pivot on the neckband, to help ensure that an earshell can be correctly positioned relative to the pinna of a wearer.

An attachment bracket, in accordance with the invention, may permit an earshell to be connected to one or more of a headband, a rail mount arm or a neckband, without the need to change the attachment bracket. Additionally, where the yoke comprises both means at each end portion for engaging with stirrups of a headband or an arm of a rail mount system, and means located at a mid-portion of the yoke for engaging with a rail mount arm of a helmet rail mount system or for engaging with an end of a neckband, this permits the attachment bracket to be mounted in different ways to different types of communications headsets, permitting a "standard" earshell to be mounted to those different types of communications headsets using a common attachment bracket.

The invention thus may not only permit a standard earshell to be produced which can be used with both a headband and a rail mount system, or neckband, but it also permits the relatively expensive earshell (and possibly any auxiliary equipment associated with that earshell, such as a microphone which may be connected to the earshell), to be quickly and easily swapped, for example from a rail mount system to a headband, or vice versa, without the need to source any alternative components.

For the avoidance of doubt, a communication headset, as used in the context of the present specification, is defined as any equipment intended to be worn on the head of a wearer and which comprises one or more earshells arranged to be placed over the ear or ears of the wearer and which may or may not additionally comprise a microphone. Particularly the communications headset may be in the form of either a headband or a helmet to which the earshell or earshells are mounted, but the term communications headset, as used in the context of the present specification, also encompasses other arrangement, such as a neckband arranged to bias a pair of earshells together in order to retain them in position on the ears of a wearer.

In addition to the above, preferably the means at each end portion of the yoke of the attachment bracket, for engaging with the stirrups of a headband and the means located at the mid-portion for engaging with a rail mount arm or for engaging with an end of a neckband, are designed to fail in preference to the components with which they are engaged. In this manner, the attachment bracket may be designed as a sacrificial item, designed to fail in preference to the relatively more expensive components it engages with.

The means located at the mid-portion of the yoke, for engaging with a rail mount arm of a helmet rail mount systems, or for engaging with an end of a neckband, may be in the form of a ball arranged to engage with a socket of a rail mount arm, or of a socket of a neckband, to permit limited pivotal movement of the attachment bracket relative to either the rail mount arm or end of a neckband. This arrangement ensures that the earshell can be correctly orientated for the comfort of the wearer and this may also provide a simple and toolless connection method between the attachment bracket and the rail mount arm or neckband, with the attachment bracket simply being clipped onto the rail mount arm or neckband by pressing the ball into the socket. Such a ball and socket arrangement may also be arranged to reduce the likelihood of damage to other components by being arranged to release in preference to the attachment bracket being damaged.

According to a second aspect of the present invention there is provided a communications headset comprising an attachment bracket in accordance with the first aspect of the present invention. The communications headset further comprises an earshell, wherein the earshell and yoke of the attachment bracket are shaped to permit the yoke to extend around the back of the earshell and at least partway across either side of the earshell, with the end portions of the yoke arranged to clip over a peripheral edge of the earshell and wherein the mid portion of the yoke has a first location feature on an inward face arranged to face towards the earshell, the location feature being arranged to engage with a second location feature formed on a back face of the earshell, to correctly locate the earshell in the yoke.

The communication headset may comprise a left-hand and a right-hand earshell, having different shapes, and a left-hand and a right-hand attachment bracket, having different shapes, to match their associated earshells.

The communications headset may comprise a headband comprising a pair of stirrups attached to respective yokes of a pair of attachment brackets, each attachment bracket being mounted to a respective earshell, wherein the end portions of the yokes each comprise a pin, lug, shaft or ball engaged with a corresponding recess, hole or socket in the headband, to permit pivotal movement of the attachment bracket and earshell relative to the headband.

The communications headset may comprise an attachment bracket for attachment to a rail mount arm of a helmet, the communications headset comprising a helmet having a rail mount system with a rail mount arm, the headset further comprising an earshell attached to the rail mount arm by the attachment bracket with the means located at the mid-portion of the yoke of the attachment bracket being engaged with the rail mount arm.

The communications headset may comprise an attachment bracket for attachment to a neckband, the communications headset comprising a neck band, a pair of earshell attached to the neckband by respective ones of a pair of said attachment brackets, with the means located at the mid-portion of the yokes of the attachment brackets being engaged with the respective ends of the neckband A communications headset in accordance with the second aspect of the invention may benefit from the above discussed advantages attributable to the attachment bracket, or brackets, forming part of that communications headset. In addition, the various features of the attachment bracket, in accordance with the first aspect of the invention, described above, may be incorporated into a single attachment bracket.

Several embodiments of the present invention will now be described, by way of example only, with reference to the accompanying figures, of which:

FIG. 4 is a first perspective view of a left-hand attachment bracket of the communications headset of FIG. 1;

FIG. 5 is a second perspective view of the left-hand attachment bracket of FIG. 4;

FIG. 6 is a first perspective view of a right-hand attachment bracket of the communications headset of FIG. 1;

FIG. 7 is a second perspective view of the right-hand attachment bracket of FIG. 4;

FIG. 12 is a cross section along the line XII-XII of FIG. 8;

FIG. 13 shows to an enlarged scale the detail XIII of FIG. 12;

FIG. 14 shows to an enlarged scale the detail XIV of FIG. 12;

Figure 15:
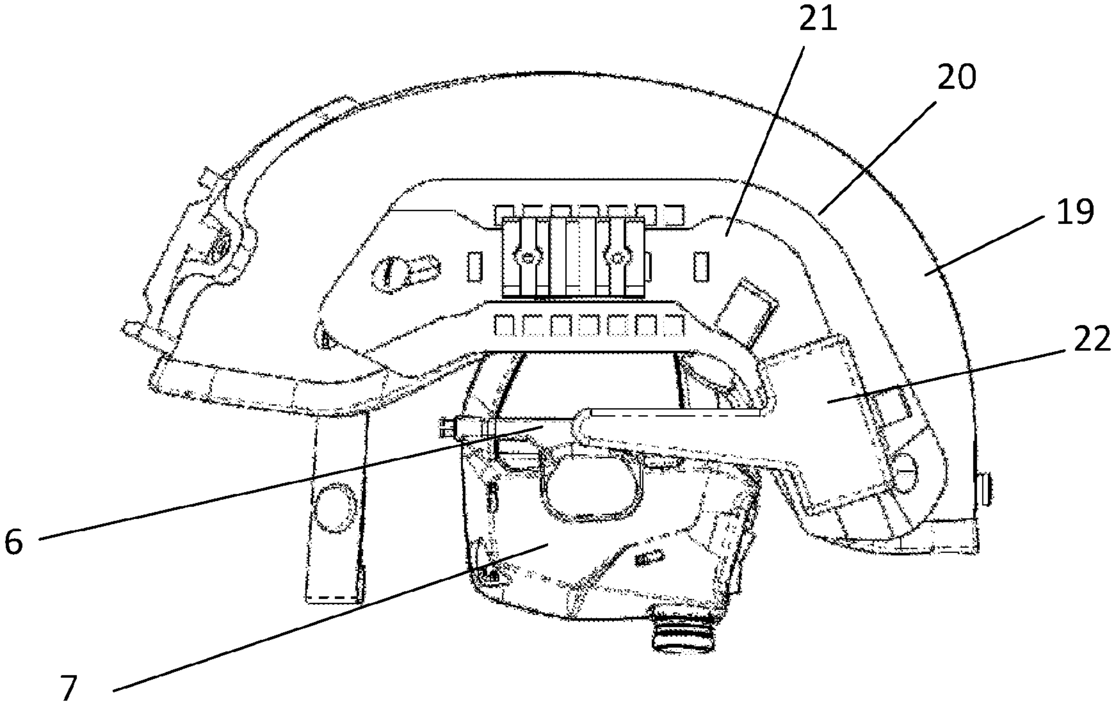
FIG. 15 is a side elevation of second embodiment of a communication headset in accordance with the present invention, where an earshell is mounted to a rail system of a helmet via a first rail mount arm.
Figure 16:
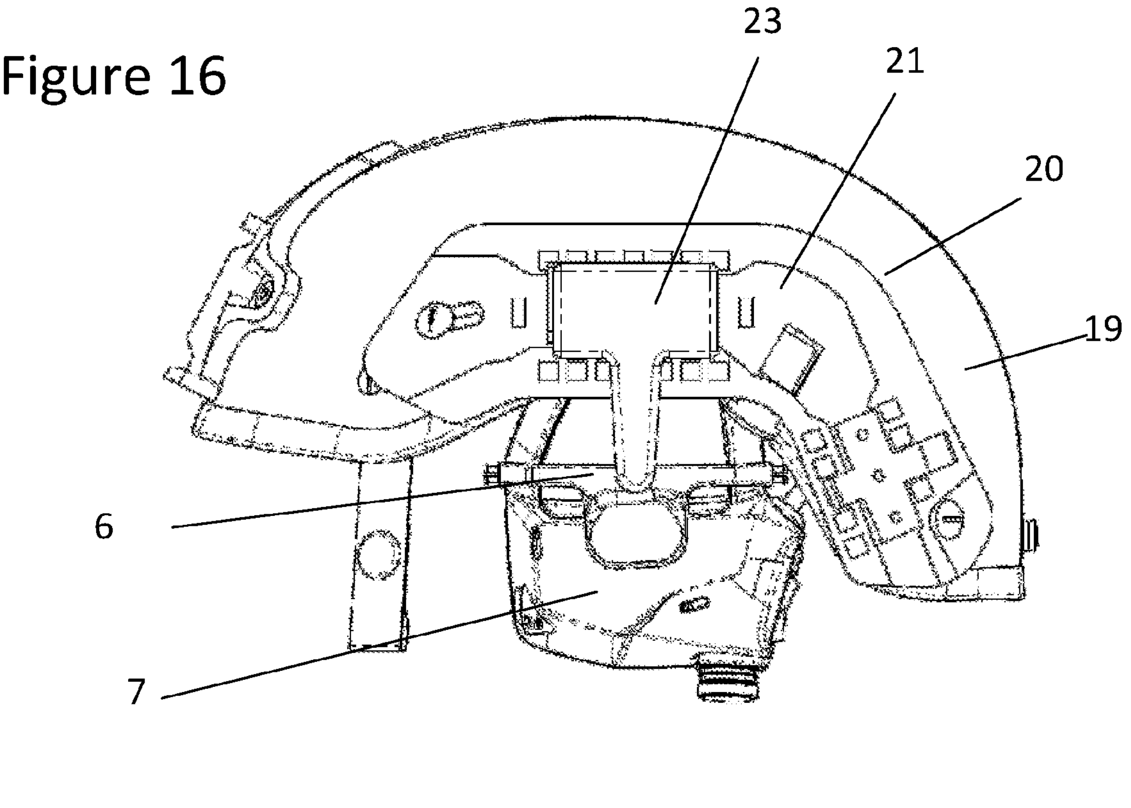
Figure 17:
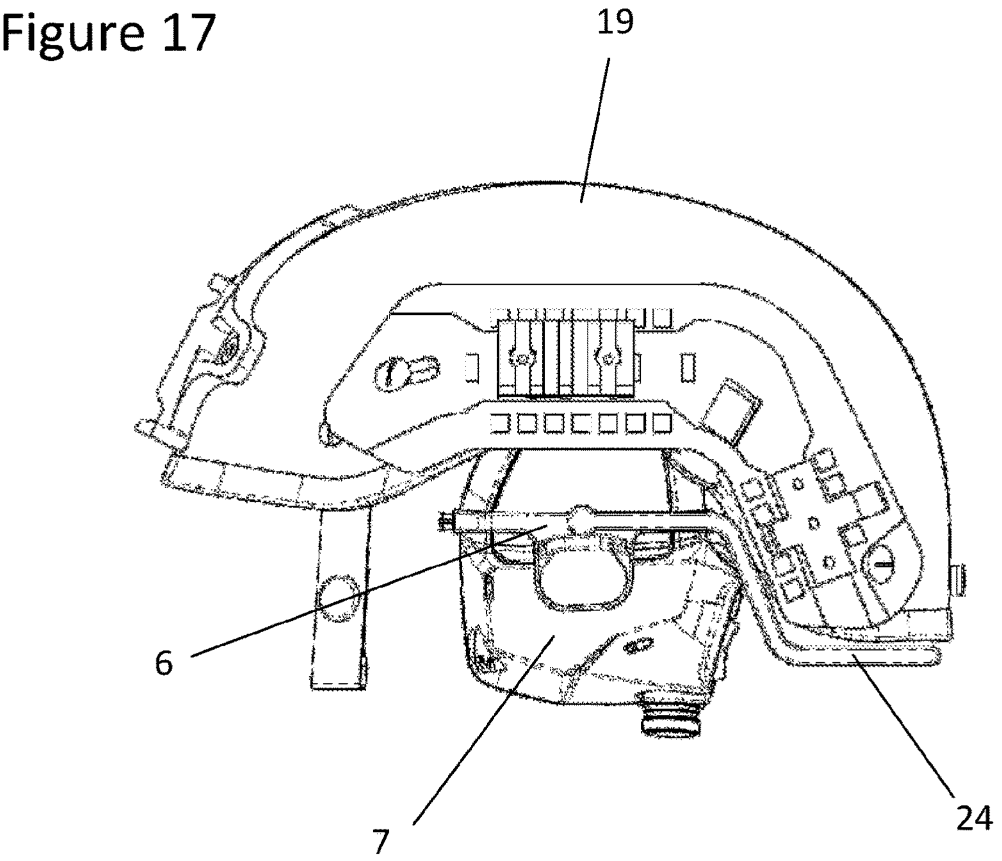

FIG. 16 corresponds to FIG. 15 but shows the use of an alternative rail mount arm;

FIG. 17 is a left-hand elevation of a third embodiment of a communications headset in accordance with the present invention employing a neckband.

Figure 18:
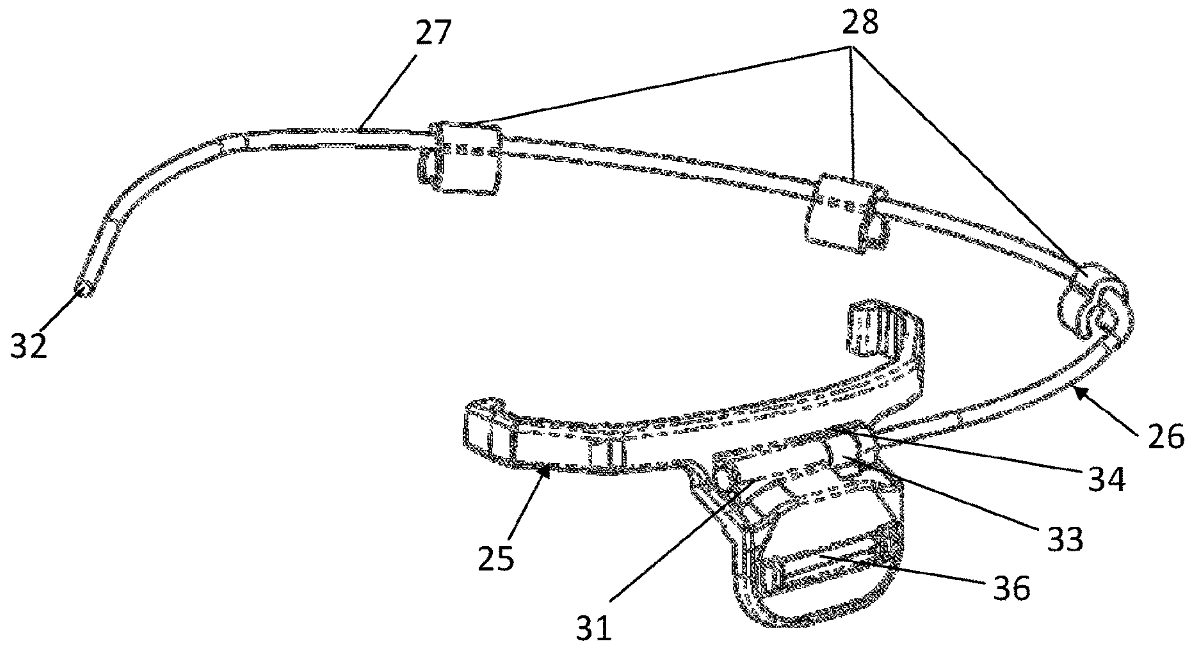
Figure 19:
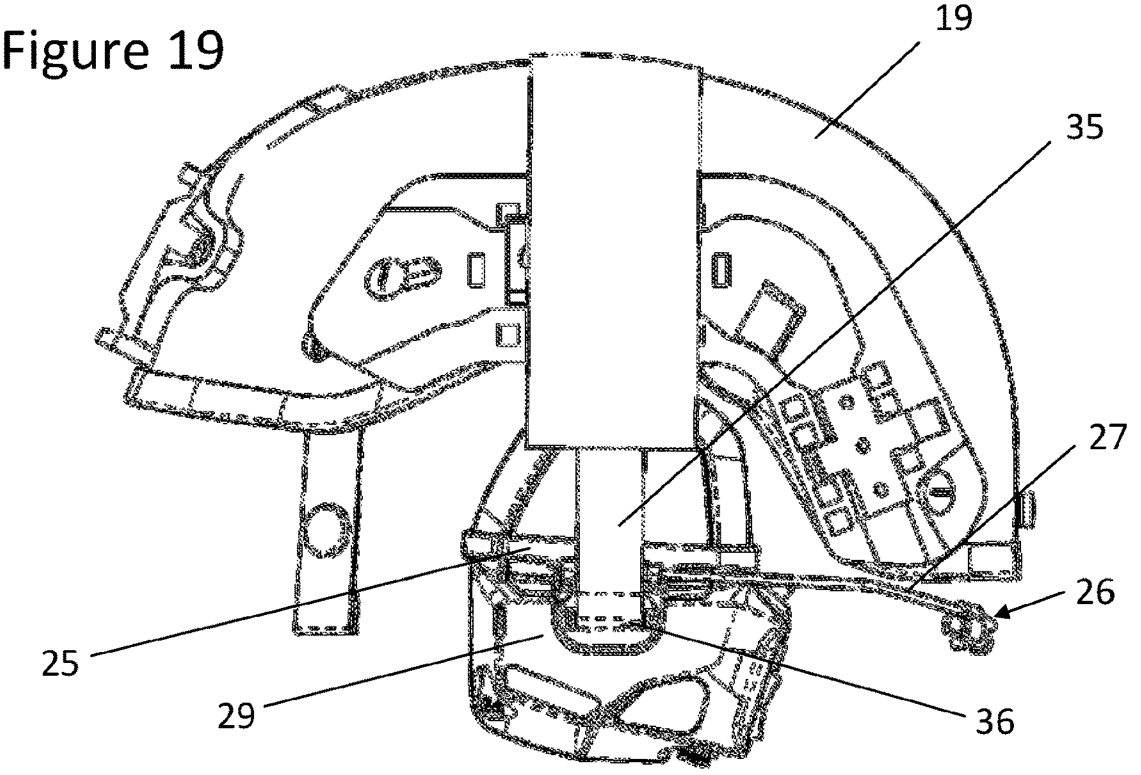
Figure 20:
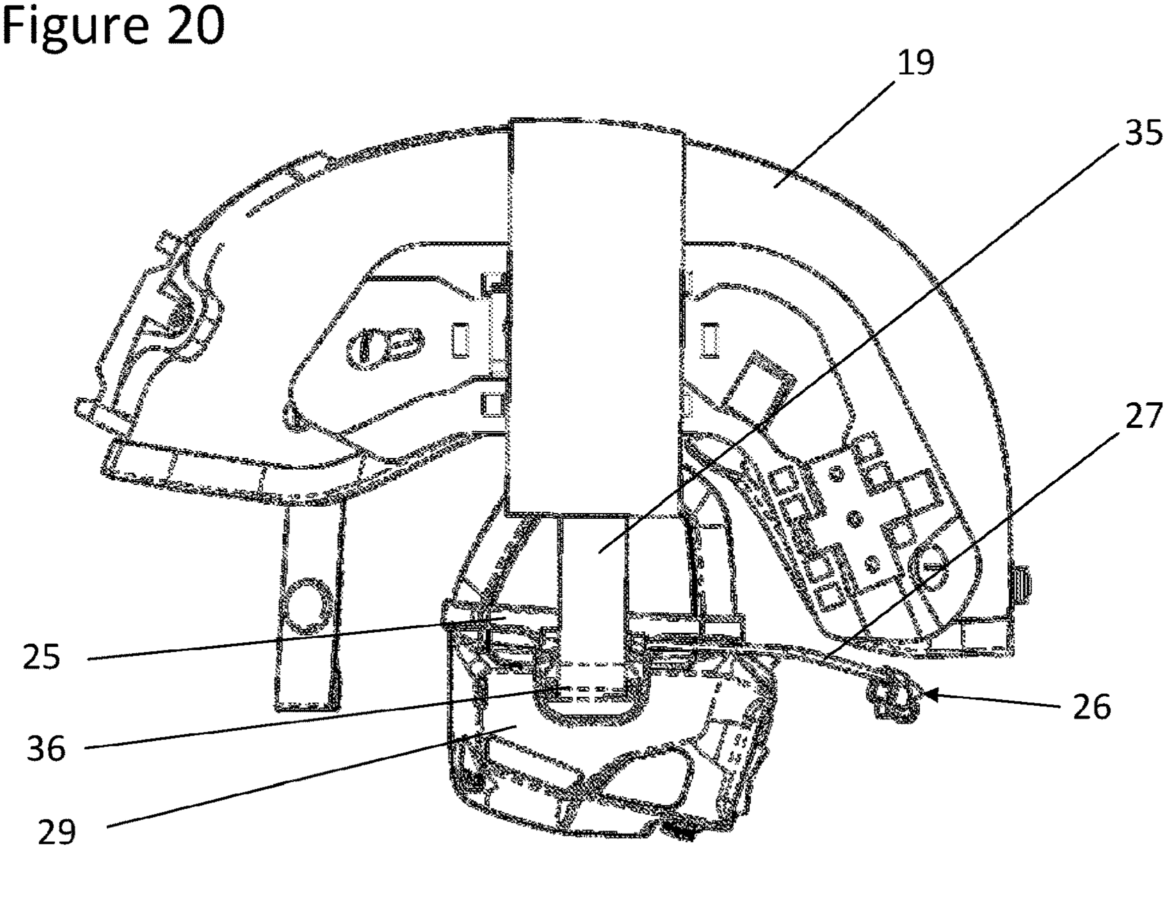
Figure 21:
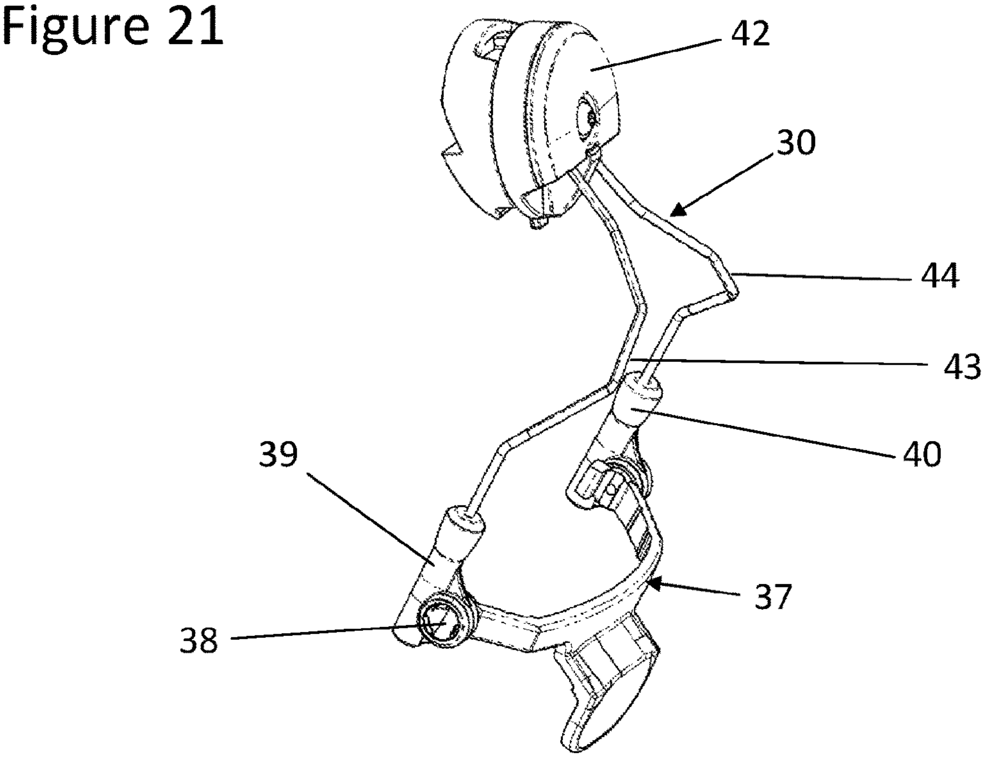
Figure 22:
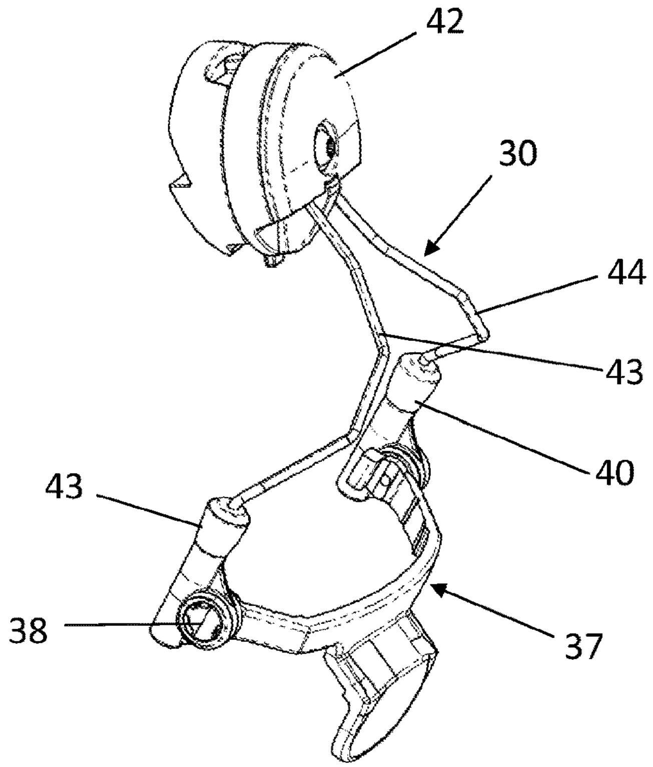
Figure 23:
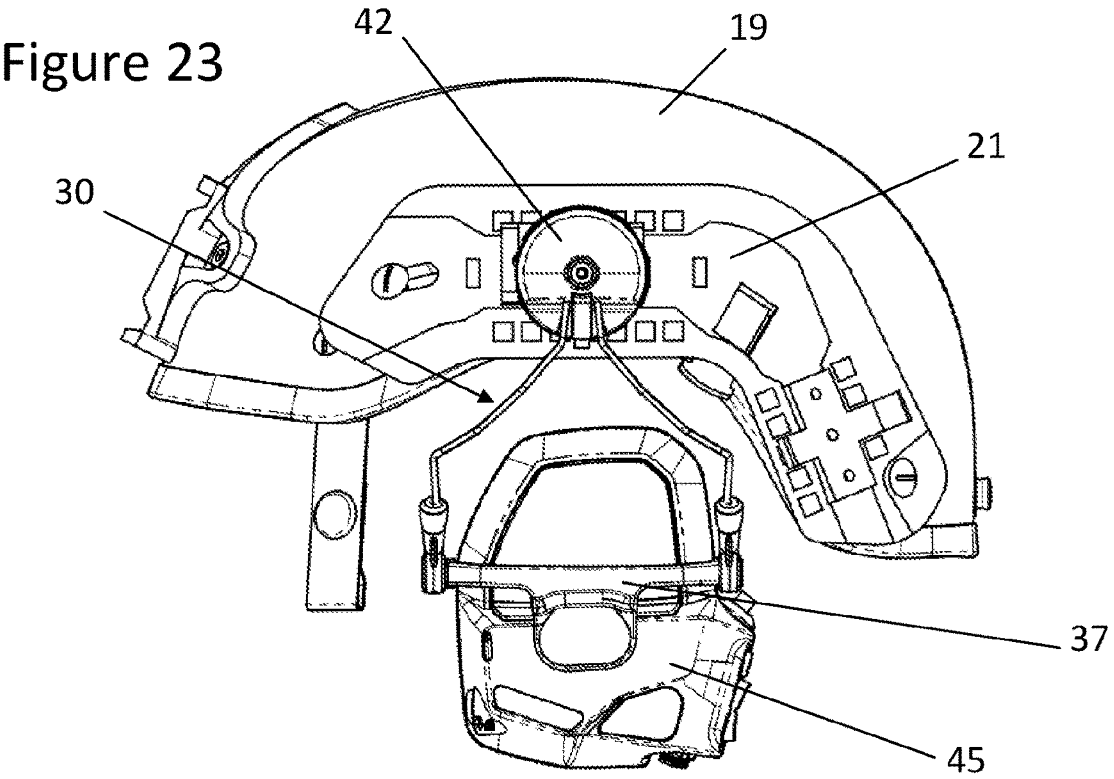
Figure 24:
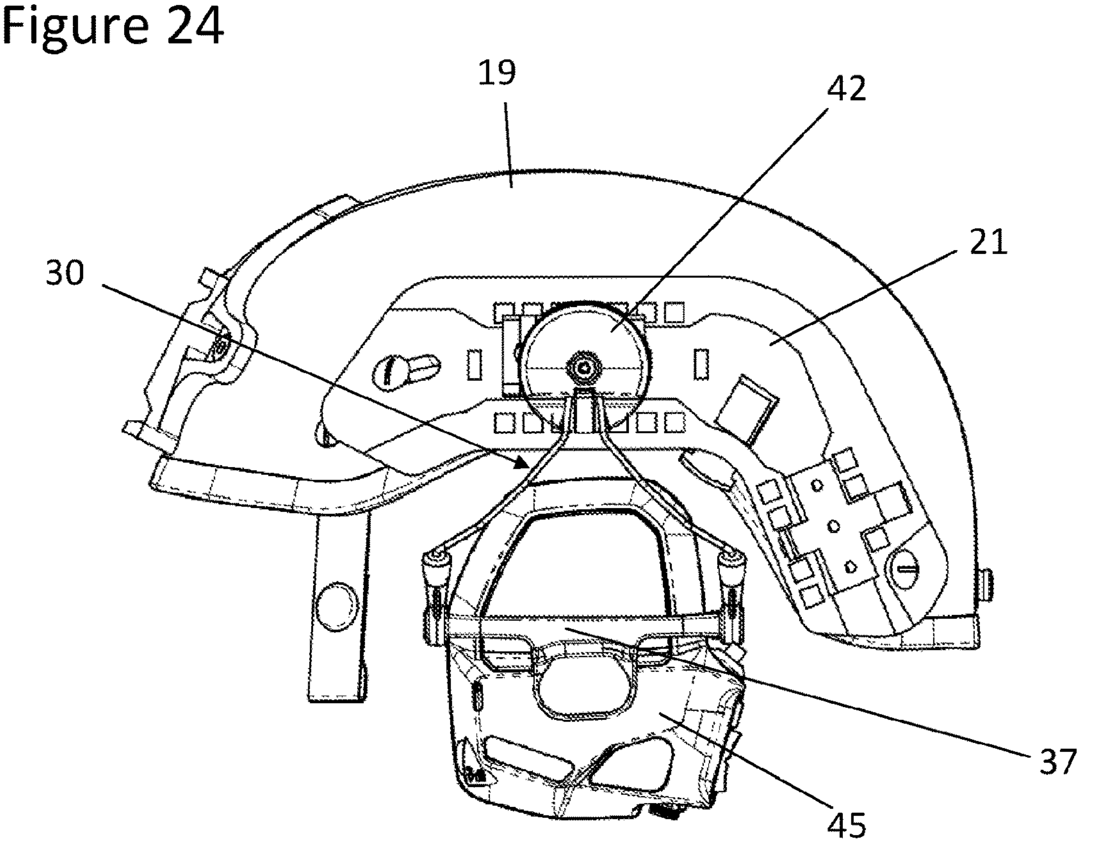

FIG. 18 shows a second embodiment of an attachment bracket in accordance with the present invention, mounted to a neckband;

FIG. 19 shows the attachment bracket and neckband of FIG. 18 positioned relative to a helmet, with an earshell attached to the attachment bracket and with the attachment bracket and earshell in an extended position on the neckband;

FIG. 20 corresponds to FIG. 19, but shows the attachment bracket in a retracted position on the neckband;

FIG. 21 shows a further embodiment of an attachment bracket in accordance with the present invention, mounted in an extended position on a rail mount arm;

FIG. 22 corresponds to FIG. 21, but shows the attachment bracket mounted in a retracted position on the rail mount arm;

FIG. 23 shows the attachment bracket and rail mount arm of FIGS. 21 and 22, together with an associated earshell, mounted on a helmet, with the attachment bracket in an extended position on the rail mount arm; and FIG. 24 corresponds to FIG. 23 but shows the attachment bracket in a retracted position on the rail mount arm.

Figure 1:
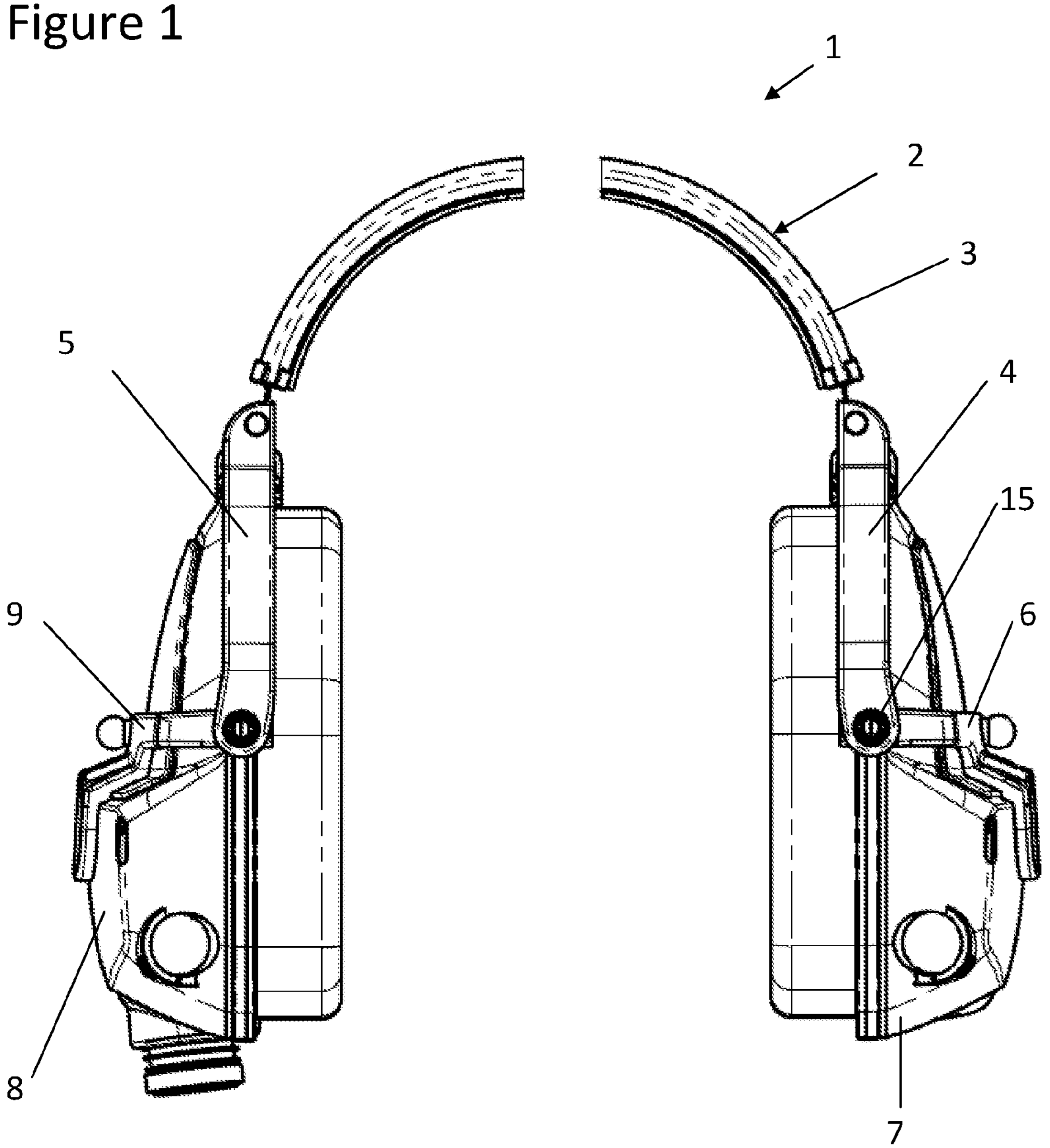
FIG. 1 is a front elevation of a first embodiment of a communications headset in accordance with the second aspect of the present invention, employing and attachment bracket in accordance with the first aspect of the present invention.
Figure 2:
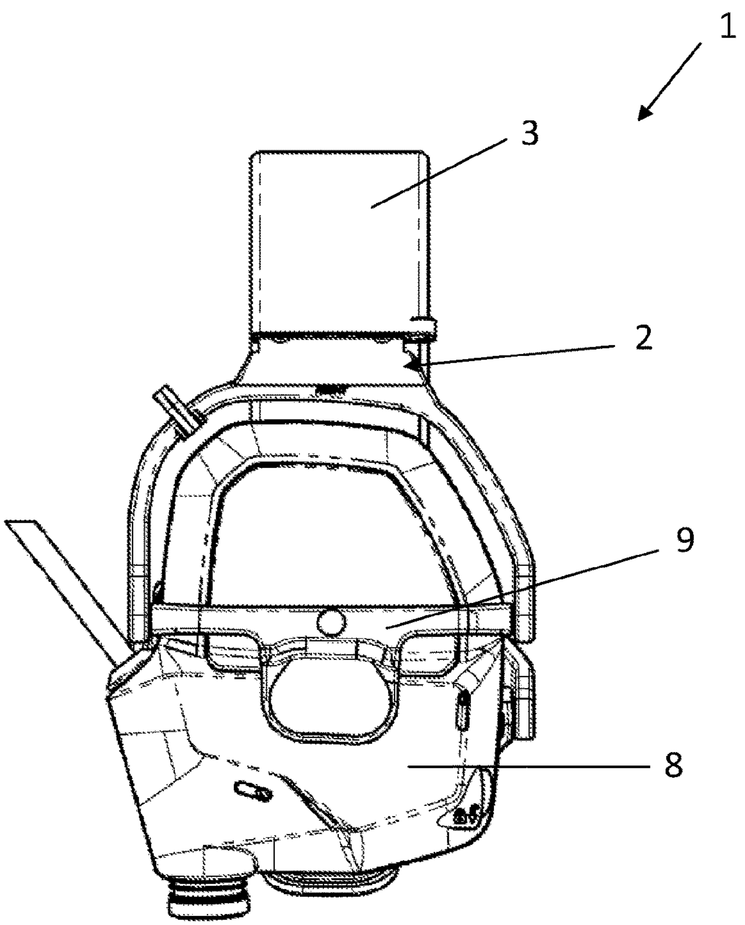
FIG. 2 is a right-hand elevation of the communications headset of FIG. 1.
Figure 3:
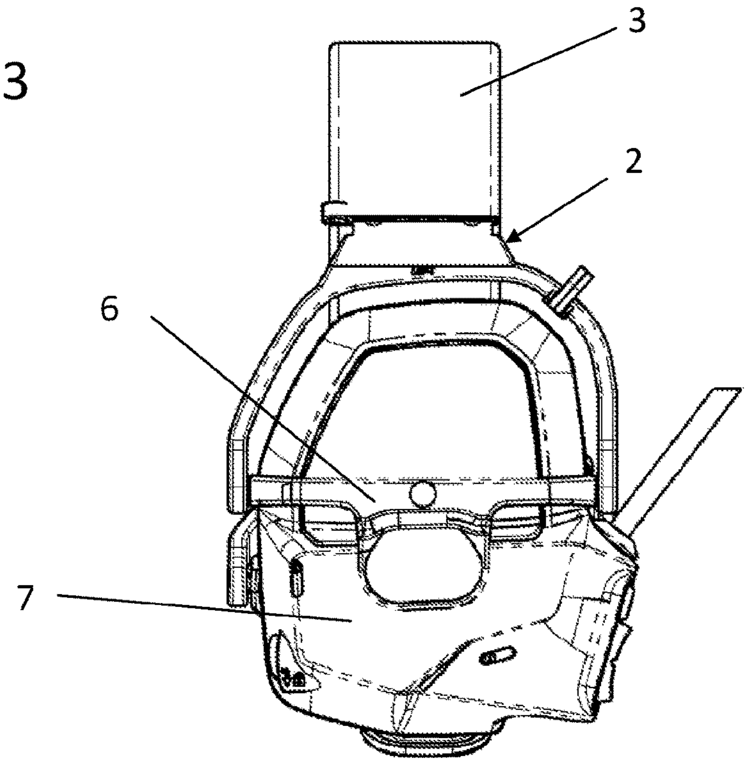
FIG. 3 is a left-hand elevation of the communications headset of FIGS. 1 and 2.

With reference to FIGS. 1 to 3 a communication headset, indicated generally as 1, comprises a headband, indicated generally 2, having a padded portion 3 from respective sides of which extend a left-hand stirrup 4 and a right-hand stirrup 5. The left-hand stirrup 4 straddles, and is pivotally connected to, a left-hand attachment bracket 6, which left-hand attachment bracket 6 in turn straddles a left-hand earshell 7, permitting the earshell 7 to pivot relative to the headband 2 by virtue of the left-hand attachment bracket 6 pivoting in the left-hand stirrup 4 of the headband 2. Although not shown here, the right-hand earshell 8 of FIG. 1 is connected in a similar manner by the right-hand attachment bracket 9 to the right-hand stirrup 5, permitting the right-hand earshell 8 to pivot in the right-hand stirrup 5.

Referring now to the perspective views of FIGS. 4 and 5, these show in greater detail the attachment bracket 6. This comprises a yoke 10 shaped to fit with the contours of the left-hand earshell 7, the yoke having engaging means 11 and 12 at respective end portions of the yoke, each arranged to clip over an edge of an earshell, as will be described in greater detail below. The attachment bracket 6 also has a protrusion 13 connected to a midportion of the yoke 6 for also engaging with the earshell, as will also be described in greater detail below.

On the two end portions of the yoke 6 there are also located two expandable lugs 14. These are each arranged to be pushed through respective apertures in respective distal ends of the left-hand stirrup 4, such they snap-fit into the left-hand stirrup 4, as shown in FIGS. 1 and 3.

The attachment bracket 6, as can be most clearly seen from FIG. 5, has on a face facing away from the left-hand earshell 7, at a mid-portion of the yoke 10, a ball 15 attached to the yoke 10. This is provided to enable the left-hand attachment bracket 6 to also be used in alternative forms of communication headsets, where it can't be connected to stirrups of a headset. The function of the ball 15 will thus become apparent from the subsequent description of FIGS. 15 to 17 below, illustrating alternative types of communications headsets.

Referring now to FIGS. 6 and 7, these are perspective views of the right-hand attachment bracket 9 and from these it will be appreciated that the right-hand attachment bracket embodies all the same features as those previously described with reference to the left-hand attachment bracket of FIGS. 4 and 5. These features function in the same manner as those of the left-hand attachment bracket 6.

Figure 10:
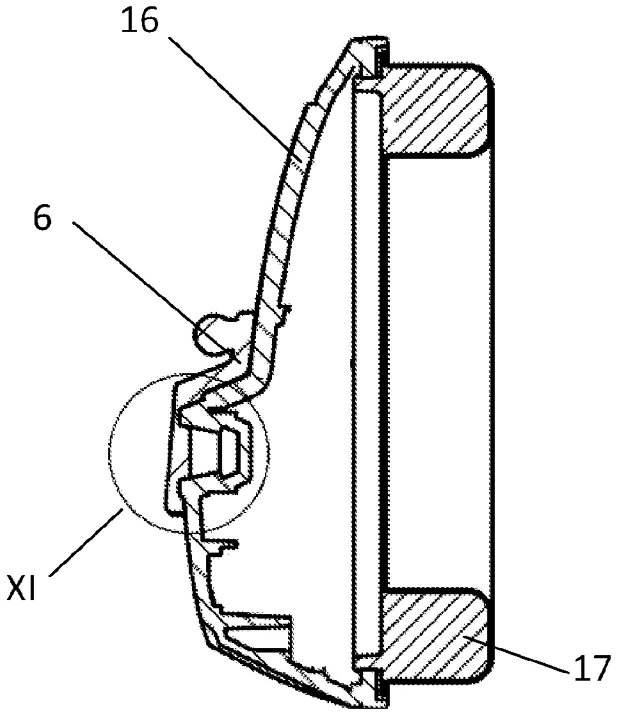
FIG. 10 is a cross section through the line X-X of FIG. 8.
Figure 11:
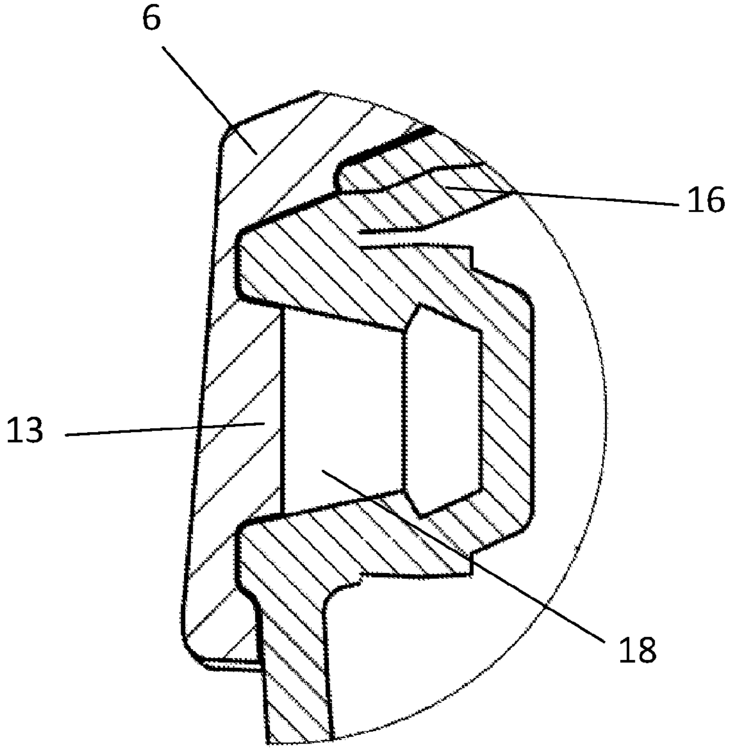
FIG. 11 shows to an enlarged scale the detail XI of FIG. 10.

Referring now to FIGS. 8 to 14, these show in detail how the left-hand attachment bracket 6 connects to the left-hand earshell 7. As can be seen in FIG. 10, a cross-section along the line X-X of FIG. 8, the left-hand earshell 7 comprises a moulded ear cup 16, (housing various electrical components not shown) and an ear cushion 17, for comfortably seating against the side of a wearer's head around the wearer's ear, to reduce ambient noise incident on the wearer's ear. As can be seen more clearly from FIG. 11, an enlargement of the detail XI of FIG. 10, the ear cup 16 has a recess 18 provided in it, with the protrusion 13 on the midportion of the left-hand attachment bracket 6 being shaped to extend into, and snuggly fit with, at least a portion of the recess 18, so that the resilience of the attachment bracket 6 may cause the protrusion 13 to latch into the recess 18, as shown in FIG. 11.

Figure 8:
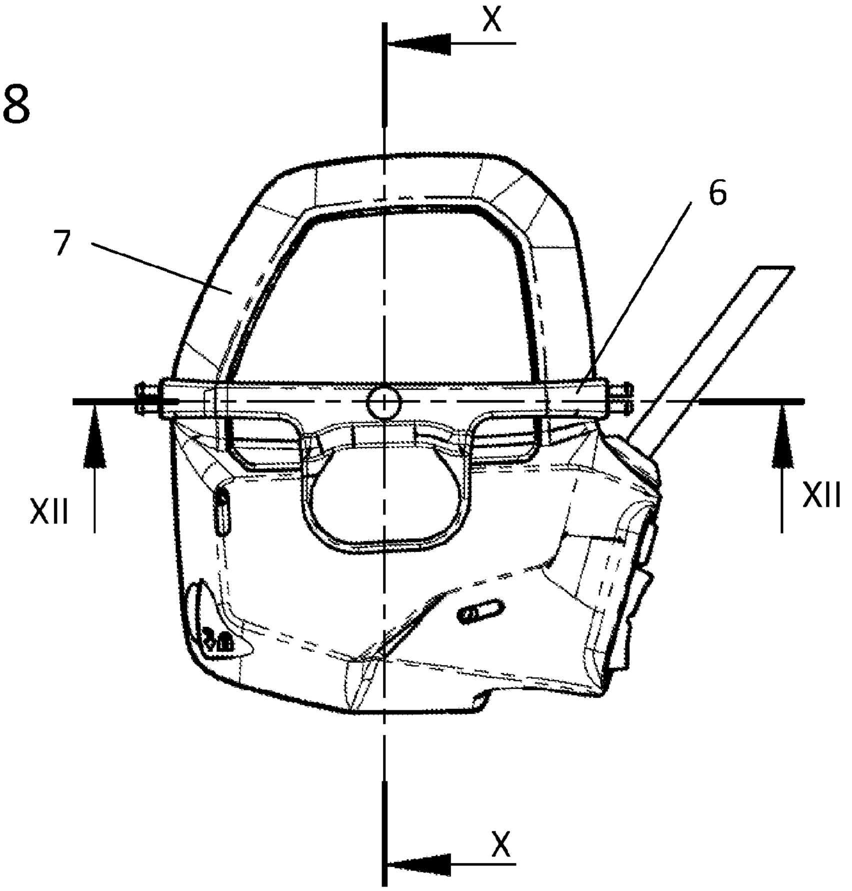
FIG. 8 is left-hand elevation showing the earshell and left-hand attachment bracket of the communications headset of FIG. 1, removed from the headband.
Figure 9:
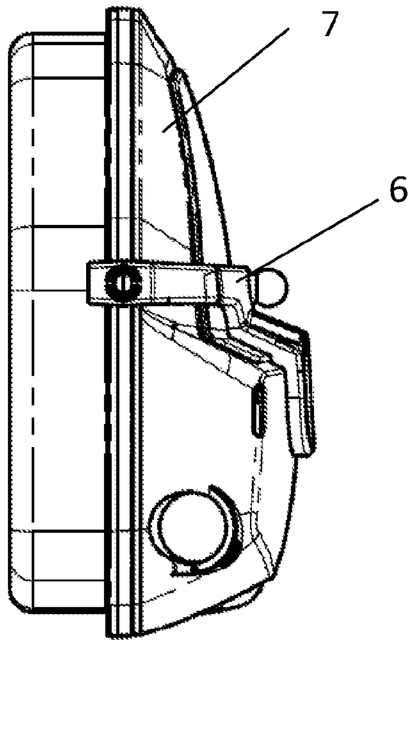
FIG. 9 is a front elevation of the left-hand earshell and left-hand attachment bracket of FIG. 8.

Referring now to FIG. 12, together with the enlarged details XIII and XIV of FIG. 12, shown in FIGS. 13 and 14 respectively, these are cross-sections along the line XII-XII of FIG. 8, and these figures show how the attachment bracket 6 engages with the earshell 7. Here the engaging means 11 and 12, at respective ends of the yoke 10 of the attachment bracket 6, are seen clipped over the front edges of the ear cup 16 of the left-hand earshell 7. Once clipped in place, the engaging means 11 and 12 act to hold the protrusion 13 of the attachment bracket 6 in the recess 18 in the ear cup 16 of the earshell 7, rigidly fixing the attachment bracket 6 to the earshell 7, with the expandable lugs 14 permitting the earshell 7 to pivot relative to the headband 2 of the communications headset as shown in FIG. 1.

The above described mounting of the earshell 7 in the attachment bracket 6, using the protrusion 13 and the engagement means 11 and 14 at the end portions of the yoke 10, means that when any excessive force is applied between the headband 2 and earshell 7, the earshell 7 is likely to detach from the attachment bracket 6, by the engaging means 11 and 12 disengaging from the front edge of the ear cup 16, due to the attachment bracket 6 distorting so as to release the earshell 7. Alternatively, the attachment bracket 6 may release the earshell 7 as a result of the attachment bracket 6 failing, with possibly one or more of the engaging means 11 or 12 shearing off from the main body of the yoke 10 of the attachment bracket 6. In either case, the attachment bracket 6 is likely to result in the headband 2 and earshell 7 remaining intact, with the attachment bracket 6 either having to be reconnected with the earshell 7 or having to be replaced.

Although only the left-hand attachment bracket 6 and left-hand earshell 7 have been described in detail above, it will be appreciated that the right-hand attachment bracket 9 and right-hand earshell 8 function in exactly the same manner.

Referring now to FIGS. 15 and 16, these show how the same (or a similar) earshell 7 may be attached via the same attachment bracket 6 to a helmet rail mount system 20, when used in a communication headset comprising a helmet rail mount system. FIGS. 15 and 16 show a helmet 19 with a rail mount system 20 fitted which comprises a helmet rail 21, with the earshell 7 and attachment bracket 6 mounted by either a first rail mount arm 22 (FIG. 15) or a second rail mount arm 23 (FIG. 16).

Helmet rail mount systems are well-known and are not described in detail here. However, in the embodiment shown in FIGS. 15 and 16 an appropriate rail mount arm 22 or 23 may be selected, in dependence on where it is desired that the rail mount arm mount to the helmet rail 21. Both rail mount arms 22 and 23 have a socket at the distal end for engaging with the ball 15 extending from the midportion of the attachment bracket 6, shown in FIG. 5. It will be appreciated that this "ball and socket" arrangement will permit the attachment bracket 6, and thus the earshell 7, to be rotated in the plane of the paper, as shown in FIGS. 15 and 16, so that the earshell 7 may be aligned with a wearer's ear such that the ear cushion 17 extends comfortably around the wearer's ear. Furthermore, the ball and socket will permit the earshell 7 to be correctly aligned, so that it may sit snuggly against the side of the wearer's head. From the above, it is seen that a single attachment bracket 6, or pair of attachment brackets 6 and 9 (the right-hand attachment bracket 9 and right-hand earshell not being shown in FIGS. 15 and 16, but functioning in an identical manner) may form either a part of a communications headset comprising a headband, for example the communications headset 1 of FIG. 1, or in a communications headset comprising a helmet rail mount system, as shown in FIGS. 15 and 16, without the need to change either the earshell 7 or the attachment bracket 6. In addition, similarly to the manner described previously with respect to the headband arrangement, when used in the helmet rail mount system 20 shown in FIGS. 15 and 16, the attachment bracket 6 may again be arranged to release the earshell 6 from the helmet 19, by the attachment bracket 6 either distorting to release the earshell, as described with reference to the previous embodiment, or with the engaging means 11 and 12 of the attachment bracket failing and thus releasing the earshell as also previously described. In addition, it is preferable for the attachment bracket to be designed such that the ball 15, under excessive force, shears from the yoke 10, in preference to damaging the rail mount arm 22 or 23.

Referring to FIG. 17, here a similar embodiment to that previously described with reference to FIGS. 15 and 16 is shown, but here the ball 15 of the attachment bracket 6 is mounted to a neck band 24, with the neck band 24 being biased to urge the respective left-hand attachment bracket 6 and right-hand attachment bracket 9 inwardly towards the head of a wearer, such that the left-hand earshell 7 and right-hand earshell 8 are retained in contact with either side of the head of the wearer. Again, the use of the left- and right-hand attachment brackets 6 and 9 offers the same advantages in this embodiment as in the previously described embodiment.

Referring now to FIG. 18, here there is shown a further embodiment of a left-hand attachment bracket 25 mounted on the left-hand end of a neck band 26, the neck band 26 comprising a spring steel rod 27 and three clips 28 for securing cabling. Although only the left-hand attachment bracket 25 is shown, a corresponding right-hand attachment bracket is mounted to the opposite distal end 32 of the rod 27 in the same manner. The attachment bracket 25 is arranged to clip on to a respective earshell, in the manner described with respect to the previous embodiments and as shown in FIGS. 19 and 20.

In the embodiment illustrated in FIG. 18, the attachment bracket 25 does not have expandable lugs 14 for attaching to a pair of stirrups of a headband or similar. However, these have been omitted from this embodiment merely to show that they are not essential to all embodiments. Thus, in alternative embodiments, such expandable lugs 14, or similar, could be formed on the distal ends of the attachment bracket 25, in exactly the same manner as illustrated in previous and in subsequent embodiments, permitting the attachment bracket 25 and respective earshell 29 to be mounted to a headband of the type illustrated in FIGS. 1 to 3, or to permit it to be mounted to a rail arm 30 of a helmet rail system as described below with reference to FIGS. 21 to 24.

Referring again to FIG. 18, the attachment bracket 25 comprises an internally moulded channel 31 through which rod 27 passes, with the channel 31 being tapered. The respective distal end 32 of the rod 27, once passed through the channel 31 is flattened to extend the maximum diameter of the distal tip 32 of the rod 27, so that this is greater than a minimum diameter of the channel 31, which is tapered. This permits the distal end 32 of the rod 27 to slide within the channel 31, but not to pass all the way back out of the channel 31, thus providing a limited amount of transverse movement of the attachment bracket 25 on the end of rod 27. Additionally, rubber bush 33 having an internal diameter less than the rod 27 is retained on the rod in cut-out portion 34 of the attachment bracket, with the rubber bush 33 providing a resistive force on the rod 27 which acts to maintain the attachment bracket 25 in a desired position on the rod 27.

The rod 27 has a generally circular cross section, apart from the flattened distal end 32, permitting the attachment bracket 25 to pivot on the rod 27.

When two attachment brackets and respective earshells are mounted on the rod 27 of the neck band 26, with cabling extending between the earshells secured in place on the neck band by the clips 28, the resilience of the spring steel rod 27 acts to hold the earshells in place over respective pinna of a wearer, with the pivotal movement of each attachment bracket and associated earshell on the rod 27 permitting the earshells to align against the face of the wearer.

With reference now to FIG. 19, this shows the left-hand attachment bracket 25, with earshell 29 clipped in place, attached to and suspended by a head strap 35 via pin 36 (see FIG. 18) of the attachment bracket 25.

As seen from FIG. 19, the neck band again acts to urge inwardly the attachment brackets 25 and associated earshells 29 against the head of a wearer. In addition, in FIG. 29, the attachment bracket 25 is shown in an extended position on the rod 27 of the neck band 26, which may be a desired position adopted where there is a relatively large spacing between the back of a wearer's neck and the pinna. However, this spacing may be reduced, if desired, to that shown in FIG. 20, or to any intermediate spacing, simply by sliding the respective attachment brackets 25 and associated earshell 29 along the rod 27 of the neck band 26.

Referring now to FIGS. 21 to 23, here there is shown a further embodiment of an attachment bracket, the attachment bracket 37 being the left-hand attachment bracket of a pair of attachment brackets, with the right-hand attachment bracket being a mirror image of the left-hand attachment bracket 37. The left-hand attachment bracket 37 comprises, at its distal ends, a pair of lugs 38 which are similar to the lugs 14 of the attachment bracket illustrated with reference to FIGS. 1 to 17.

The lugs 38 of the embodiment of FIG. 21 could be identical to the lugs 14 described with reference to the embodiments of FIGS. 1 to 17. However, to show that the lugs 38 may have numerous forms, the lugs 38 illustrated in FIG. 21 have a different form, whereby the distal portions 39 and 40 of the rail arm 30 can only be removed when retention members 41, forming part of the lugs 38, are correctly aligned with the end portions 39 and 40, so that the end portions 39 and of the rail arm 30 may only be released when rotated through approximately 180° from the position shown in FIGS. 21 and 22, a position not encountered during normal use, but which permits easy removal of the attachment bracket, without the use of tools.

The end portions 39 and 40 of the rail arm 30 are connected to a housing 42 by a captive bent spring steel rod having two arms 43 and 44. The housing 42 of the rail arm 30 urges the spring steel rod arms 43 and 44 inwardly, so that when the housing 42 of the rail arm 30 is mounted to a helmet rail 21 of a rail mount system of a helmet 47, with the earshell 45 being clipped to the attachment bracket 37, as shown in FIGS. 23 and 24, the earshell 45 is urged inwardly (towards a wearers ear).

Each of the end portions 39 and 40 comprise a central channel and connect to respective spring steel rods 43 and 44 in the same manner that the attachment bracket 25 of FIG. 18 attaches to the end of the spring steel rod 27 of the neck band 26. The end portions 39 and 40 may thus slide to a limited extent along the ends of the respective arms 43, 44. This permits the attachment bracket 37 and associated earshell 45 to be adjusted vertically by a wearer, between the fully extended position shown in FIGS. 21 and 23 and the fully retracted position shown in FIGS. 22 and 24. Thus the wearer of the helmet 19 of FIGS. 23 and 24 may position the earshell at a desired vertical position relative to their pinna.

Several embodiments of the present invention have been described above by way of example only. However, it will be appreciated that many further modifications may be made without departing from the scope of the invention, as defined by the following claims.

The invention claimed is:

1. An attachment bracket suitable for attaching an earshell of a communications headset to a headband a rail mount system of a helmet, the attachment bracket comprising:

a main body in the form of a yoke having two end portions and a mid-portion therebetween, the yoke being shaped to extend around the back of an earshell and to extend at least partway around opposed sides of the earshell, wherein the two end portions of the yoke are arranged to clip over a peripheral edge of the earshell, and each end portion of the yoke comprises means for engaging with stirrups of a headband or of a rail mount system of a helmet.

2. The attachment bracket of claim 1, wherein the yoke is formed of a resilient material to permit the yoke to be distorted, to spread the end portions of the yoke to enable the end portions of the yoke to extend over a peripheral edge of the earshell and to subsequently resile, so that the end portions of the yoke engage with the earshell and retain the earshell in the yoke.

3. The attachment bracket of claim 1, wherein the mid-portion of the yoke has a first location feature on an inward face arranged to face towards the earshell, the first location feature being arranged to engage with a second location feature formed on a back face of the earshell, to correctly locate the earshell in the yoke.

4. The attachment bracket of claim 3, wherein the first location feature is a protrusion and wherein the second location feature is a recess.

5. The attachment bracket of claim 1, wherein the end portions of the yoke are shaped to clip over a front facing edge of the earshell.

6. The attachment bracket of claim 1, wherein the means for engaging with stirrups of a headband or of a rail mount system of a helmet comprises a pin, shaft, or ball arranged to engage with a corresponding recess, hole, or socket in the headband or the rail mount system to permit pivotal movement about a first axis of the attachment bracket relative to the headband or the rail mount system.

7. The attachment bracket of claim 1, further comprising, at the mid-portion of the yoke, means for engaging with the rail mount arm of a rail mount system of a helmet.

8. The attachment bracket of claim 7, wherein the means for engaging with a rail mount arm of a rail mount system of a helmet is configured to permit limited pivotal movement of the attachment bracket relative to the rail mount arm.

9. The attachment bracket of claim 1, comprising a homogeneous single piece of molded plastic.

10. A communications headset comprising an attachment bracket according to claim 1.

11. A communications headset comprising an attachment bracket according to claim 1 and an earshell, wherein the yoke of the attachment bracket is shaped to permit the yoke to extend around the back of the earshell and at least partway around opposed sides of the earshell, and wherein the mid-portion of the yoke has a first location feature on an inward face arranged to face towards the earshell, the first location feature being arranged to engage with a second location feature formed on a back face of the earshell, to correctly locate the earshell in the yoke.

12. A communications headset comprising an attachment bracket according to claim 1 and a helmet having a rail mount system, the communications headset further comprising an earshell attached to the rail mount system by the attachment bracket.

13. A communications headset comprising a pair of attachment brackets each according to the attachment bracket of claim 1 and a neck band, the system further comprising a pair of earshells attached to respective ends of the neckband by respective attachment brackets of the pair of attachment brackets.

14. A communications headset comprising an attachment bracket according to claim 1, wherein, for each end portion, the means for engaging with stirrups of a headband or of a rail mount system of a helmet is configured to fail, by shearing from the yoke under excessive force, in preference to the stirrups of a headband or of a rail mount system of a helmet to which the means for engaging are engaged.

15. The communications headset of claim 13, wherein the pair of earshells comprises a left-hand earshell and a right-hand earshell, having different shapes, wherein the pair of attachment brackets comprises a left-hand attachment bracket and a right-hand attachment bracket, having different shapes, wherein the left-hand attachment bracket matches the left-hand earshell, and wherein the right-hand attachment bracket matches the right-hand earshell.

16. A communications headset comprising an attachment bracket according to claim 7, wherein the means for engaging with the rail mount arm of a rail mount system of a helmet is configured to fail, by shearing from the yoke under excessive force, in preference to the rail mount arm to which the means for engaging are engaged.

17. The attachment bracket of claim 1, further being suitable for attaching an earshell of a communications headset to a neckband, wherein the attachment bracket further comprises, at the mid-portion of the yoke, means for engaging with an end of the neckband.

18. The attachment bracket of claim 17, wherein the means for engaging with an end of the neckband is configured to fail, by shearing from the yoke under excessive force, in preference to the end of the neckband to which the means for engaging are engaged.

19. The attachment bracket of claim 17, wherein the means for engaging with an end of the neckband is configured to permit limited pivotal movement of the attachment bracket relative to the end of the neckband.

20. The attachment bracket of claim 17, wherein the means for engaging with an end of the neckband comprises a guide that is substantially horizontal when the attachment bracket is attached to an earshell worn by a wearer sitting or standing upright, the guide being arranged to be mounted on the end of a neckband in the form of a resilient rod, with the guide being arranged to permit the earshell to slide backward and forwards on the resilient rod of the neckband.

* * * * *